(12) United States Patent
Ying et al.

(10) Patent No.: US 12,337,508 B2
(45) Date of Patent: Jun. 24, 2025

(54) RIGID WIND TURBINE BLADE MOULD STRUCTURE CAPABLE OF RAPIDLY REPLACING MOULD PROFILE

(71) Applicant: GURIT TOOLING (TAICANG) CO., LTD., Suzhou (CN)

(72) Inventors: Xudong Ying, Suzhou (CN); Binjiang Chen, Hacienda Heights, CA (US); Jialin Lu, Suzhou (CN)

(73) Assignee: GURIT TOOLING (TAICANG) CO., LTD., Suzhou (CN)

( * ) Notice: Subject to any disclaimer, the term of this patent is extended or adjusted under 35 U.S.C. 154(b) by 121 days.

(21) Appl. No.: 18/338,148

(22) Filed: Jun. 20, 2023

(65) Prior Publication Data

US 2024/0066761 A1    Feb. 29, 2024

Related U.S. Application Data

(63) Continuation of application No. PCT/CN2022/139906, filed on Dec. 19, 2022.

(30) Foreign Application Priority Data

| Aug. 29, 2022 | (CN) | .......................... 202211039173.5 |
| Aug. 29, 2022 | (CN) | .......................... 202222275307.5 |
| Sep. 7, 2022 | (CN) | .......................... 202211089341.1 |
| Sep. 7, 2022 | (CN) | .......................... 202222374899.6 |

(51) Int. Cl.
  *B29C 33/30* (2006.01)
  *B29C 33/38* (2006.01)
  *B29L 31/08* (2006.01)

(52) U.S. Cl.
  CPC .......... *B29C 33/308* (2013.01); *B29C 33/307* (2013.01); *B29C 33/3842* (2013.01); *B29L 2031/085* (2013.01)

(58) Field of Classification Search
  CPC .......... B29L 2031/08; B29L 2031/082; B29L 2031/085; B29D 99/0025; B29D 99/0028; B29C 33/307; B29C 33/308; B29C 33/3842
  See application file for complete search history.

(56) References Cited

U.S. PATENT DOCUMENTS

| 11,007,677 B2 * | 5/2021 | Hannan | ................... B29C 33/32 |
| 11,964,348 B2 * | 4/2024 | Henrichsen | ............ F03D 80/00 |

(Continued)

*Primary Examiner* — Sang K Kim
(74) *Attorney, Agent, or Firm* — CBM PATENT CONSULTING, LLC

(57) ABSTRACT

A rigid wind turbine blade mould structure capable of rapidly replacing a mould shell without change of supporting structure of the mould includes a stationary supporting structure for supporting an upper mould and a lower mould and a clamping structure for clamping the upper mould and the lower mould; wherein if the mould shell on the supporting mechanism is the lower mould, to change a different mould shell type, there is no need to move the bottom support adjusting devices to support the lower mould, and only lift away the lower mould profile/shell structure by an overhead crane; if the mould shell on the supporting mechanism is the upper mould, the upper mould needs to be turned over to be above the lower mould through the hinge beam, and the hinge beam supporting structure stays.

8 Claims, 5 Drawing Sheets

(56) References Cited

U.S. PATENT DOCUMENTS

2015/0033544 A1* 2/2015 De Waal Malefijt ........................ F03D 1/0675
269/21
2024/0017447 A1* 1/2024 Shi ........................ B29C 33/307

* cited by examiner

RIGID WIND TURBINE BLADE MOULD STRUCTURE CAPABLE OF RAPIDLY REPLACING MOULD PROFILE

CROSS-REFERENCE TO RELATED APPLICATIONS

This application is the Continuation application of International Application No. PCT/CN2022/139906 filed on 19 Dec. 2022 which designated the U.S. and claims priority to Chinese Application Nos. CN202211039173.5 and CN202222275307.5 filed on 29 Aug. 2022, and CN 202211089341.1 anti CN 202222374899.6 filed on 7 Sep. 2022, the entire contents of each of which are hereby incorporated by reference.

TECHNICAL FIELD

The present invention relates to the field of wind turbine blade moulds, and in particular to a rigid wind turbine blade mould structure capable of rapidly replacing a mould profile.

BACKGROUND

Wind energy is increasingly gaining attention as a clean renewable energy source in all countries of the world. It has huge energy storage capacity. The global wind energy is about $2.74 \times 10^9$ MW, including available wind energy of $2 \times 10^7$ MW, which is 10 times the total volume of available hydroenergy on the earth. Wind has been used for a long time, and in the past usages mainly included water pumping, flour grinding and the like through windmills. However, at present, people are interested in how to generate electricity through wind, and the principle of wind power generation is that wind power is used for driving blades of windmills to rotate, and then the rotation speed is increased through speed increasers to promote generators to generate electricity. According to the current wind power generation technology, the power generation can be started at a breeze speed of about three meters per second. Wind power generation is setting off a wave around the world because it has no fuel problems and does not produce radiation or air pollution.

With the rapid development of clean energy in China and the rapid development of the wind power industry, the megawatt level of the wind turbine blades has been larger and larger, the length of the wind turbine blades has increased from twenty or thirty meters to over one hundred meters, and therefore when a blade mould is manufactured, the manufacturing cost is higher, and the operation process is complex.

The current structure of a wind turbine blade mould shell is typically made of a polymer composite material, such as fiber reinforced plastic, and may include a core material, such as artificial foam, wood, and metal honeycomb material, inside the mould shell. Typical forming processes include hand lay-up forming, hand lay-up bag moulding, vacuum introduction forming, autoclave forming, resin transfer moulding, prepreg laying forming and the like. Typical mould shell structures are typically of relatively uniform thickness, the primary function of which is to provide the required physical dimensions, process conditions (e.g., vacuum, temperature, and surface roughness), etc. for blade manufacture.

Because the mould shell is thin and low in rigidity, the maintenance of the geometric shape in the production process of the blade cannot be guaranteed by the mould shell alone, and therefore the mould shell is often supported by a complex steel frame. In a typical process of blade production, a steel frame is the source of rigidity of the whole mould system in the processes of blade forming in a mould opening state, mould assembly and the like. The existing mould shell has the characteristic of low rigidity, and the rigidity of a steel frame needs to be higher, so that the design is complex, the weight is relatively heavy, and the manufacturing period is long. In the prior art, in order to connect a mould shell and a steel frame, a metal pipe along the length direction of the mould is usually arranged on the mould steel frame, then a fiberglass cloth soaked with resin is wrapped around the metal pipe and hand laid-up on the back surface of the mould shell, and then the metal pipe is waited for curing. The metal pipes can be arranged in parallel in the width direction of the mould, shape-fitting metal plates are used for being locally connected with the mould shell, and the connection has more degrees of freedom, so that the deformation of the mould shell in the width direction cannot be completely restrained, and the conditions of large mould profile change and unstable quality along the direction in the blade production process are caused.

In order to improve the rigidity of the mould shell, different types of reinforcing ribs are generally designed and mounted on the back of the mould shell, or the thickness of the shell is increased. Different types of core materials are adopted, such as PET, PVC, balsa wood, and aluminum honeycombs, to improve the rigidity of the mould shell; the materials have high cost and heavy weight, cause environment pollution during moulding, and cause certain damage to the health of workers if they contact the composite material for a long time.

SUMMARY

Objective: The present invention is intended to solve the shortcomings in the prior art by providing a rigid wind turbine blade mould structure capable of rapidly replacing a mould profile which improves the flexural rigidity, thus greatly improving the anti-deformation capacity of a shell to simplify the supporting structure, accelerating the manufacturing and mounting process, reducing the dimensions of the structure, reducing the overall weight of a mechanism, facilitating the transportation, reducing the energy consumption and pollution, improving the mounting efficiency and saving the cost.

Technical solution: In order to achieve the above objective, the present invention provides a rigid wind turbine blade mould structure capable of rapidly replacing a mould profile, comprising a supporting structure for supporting an upper mould or a lower mould and a clamping structure for clamping the upper mould and the lower mould; wherein the supporting structure comprises: a cross sectional steel frame, bottom support adjusting devices, sectional support frames, supporting rods, guide rails, connecting device section steel structure and sliding blocks, wherein the cross sectional steel frame is arranged on a turning device in a sleeving manner, the bottom support adjusting devices are vertically mounted on the cross sectional steel frame, one end of the connecting device section steel structure is vertically and fixedly connected to the bottom of the cross sectional steel frame, the other end of the connecting device section steel structure is connected with telescopic rods, the guide rails are mounted at the bottom of the cross sectional steel frame, one end of each supporting rod is hinged to the corresponding telescopic rod, and the other end of each supporting rod moves horizontally and linearly on the corresponding guide rail through the corresponding sliding block.

After the mould profile of the mould shell is confirmed, when the supporting height of the supporting mechanism needs to be adjusted, the telescopic rods are firstly extracted to a limited height from the connecting device section steel structure, at the moment the sliding blocks slide to limited positions on the guide rails under the driving of the supporting rods, and then are inserted into the bolt holes through bolts so as to limit the positions of the sliding blocks on the guide rails, finally a triangle is constituted by the supporting rods, the cross sectional steel frame and the connecting device section steel structure, thereby ensuring the stability and the reliability of the supporting connecting rods to support the mould profile.

The clamping mechanism comprises: an electromagnet, a metal block and a locking device, wherein the electromagnet or the metal block is respectively mounted in a flange edge of the upper mould or the lower mould, and the locking device is arranged at a joint of the flange edge of the upper mould and the flange edge of the lower mould in a sleeving manner; the locking device is controlled to be the prior art through the power-on and power-off control of the electromagnet, which is not repeated herein.

If the mould shell on the supporting mechanism is the lower mould, after the demoulding of the master mould is finished, the bottom support adjusting device supports the lower mould, and the lower mould is lifted away by a travelling crane; if the mould shell on the supporting mechanism is the upper mould, after the demoulding of the master mould is finished, the upper mould needs to be turned over to be above the lower mould through the hinge beam, and the flange edges of the upper mould and the lower mould are limited to be closed to each other by utilizing the clamping mechanism so as to lock the upper mould and the lower mould.

In a further preferred embodiment of the present invention, the connecting device section steel structure and the supporting rods are respectively and symmetrically arranged on the cross sectional steel frame, and the two supporting rods move horizontally on the guide rails to consolidate the supporting strength of the connecting device section steel structure relative to the cross sectional steel frame; the support of a plurality of sectional support frames are matched with the supporting connecting rods for adjusting the height so as to support the upper mould or the lower mould, thereby ensuring the stability of the position of the upper mould or the lower mould located above the sectional support frames and the connecting device section steel structure.

In a further preferred embodiment of the present invention, a piston rod on each bottom support adjusting device is detachably connected with the corresponding sectional support frame. When the rigid wind turbine blade with different mould profile needs to be replaced, only the sectional support frames need to be removed, the dimensions of the sectional support frames matched with the shape of the blade and the telescopic height of the telescopic rods on the connecting device section steel structure are adjusted, and thus the mould shell with different mould profiles are adaptive.

In a further preferred embodiment of the present invention, a shape of the sectional support frames is matched with a shape of an outer surface of a mould shell above the sectional support frames for supporting the wind turbine blade with different dimensions.

In a further preferred embodiment of the present invention, the number of the bottom support adjusting devices is at least two, thereby ensuring the stability and reliability of the support.

In a further preferred embodiment of the present invention, the guide rails are fixed to the bottom of the cross sectional steel frame in a threaded connection manner. When the rigid blade with an uncommon dimension needs to be quickly replaced, the positions of the two guide rails are adjusted to adjust the telescopic height of telescopic rods on the connecting device section steel structure.

In a further preferred embodiment of the present invention, bolt holes are formed in the guide rails and configured for limiting the sliding blocks. When the sliding blocks need to move horizontally to limited positions, by inserting bolts into the bolt holes in advance, the sliding blocks slide to extreme positions on the guide rails to limit the sliding blocks to be in the extreme positions on the guide rails.

In a further preferred embodiment of the present invention, the supporting rods and the sliding blocks are connected in a hinged manner.

In a further preferred embodiment of the present invention, the bottom support adjusting devices and the locking device are respectively powered by an air pump system or a hydraulic system.

In a further preferred embodiment of the present invention, the air pump system or the hydraulic system is connect with the PLC circuit.

In a further preferred embodiment of the present invention, the end parts of two adjacent telescopic rods are respectively and vertically connected with the supporting connecting rods, which guarantees the stability and the reliability for supporting the mould shell, simultaneously, according to a curved surface of the mould shell with different mould profiles, different mould shells can be adaptive.

In a further preferred embodiment of the present invention, guide concave-convex blocks are arranged on inner surfaces of the flange edges of the upper mould and the lower mould and configured for aligning relative positions of the upper mould and the lower mould.

Beneficial effects: Compared with the prior art, the rigid wind turbine blade mould structure capable of rapidly replacing a mould profile provided in the present invention has the following advantages:

(1) by eliminating the use of complex steel frame structure, the overall weight of the mould reduced and the cost is saved;

(2) the flexural rigidity of the enhanced glass fiber reinforced plastic mould shell structure is greater than that of a common mould shell by several orders of magnitude, so that the anti-deformation capacity of the shell is greatly improved, providing necessary conditions for fewer and simple support structure;

(3) the flexural rigidity of the mould shell obtained by the mould is higher than that of the mould shell in the prior art, so that the anti-deformation capacity of the shell is greatly improved to simplify the supporting structure, the manufacturing and mounting process is accelerated, the dimensions of the structure are reduced, the overall weight of a mechanism is reduced, the transportation is facilitated, the energy consumption and pollution are reduced, the mounting efficiency is improved and the cost is saved;

(4) when the rigid wind turbine blade with different mould profiles needs to be replaced, only the sectional support frames need to be removed, the dimensions of the sectional support frames matched with the shape of the blade and the telescopic height of the telescopic rods on the connecting device section steel structure relative to the cross sectional steel frame are adjusted, and waste and pollution are reduced;

(5) the rapid replacement of the mould shell is realized through the integral structure, so that the time cost of the overall mould is reduced, and the sustainable development policy is supported; and (6) the rigid wind turbine blade mould structure capable of rapidly replacing a mould profile is simple to manufacture, easy to operate, convenient to construct, high in use flexibility, good in adaptability and easy to popularize and apply.

DETAILED DESCRIPTION

Figure 1:
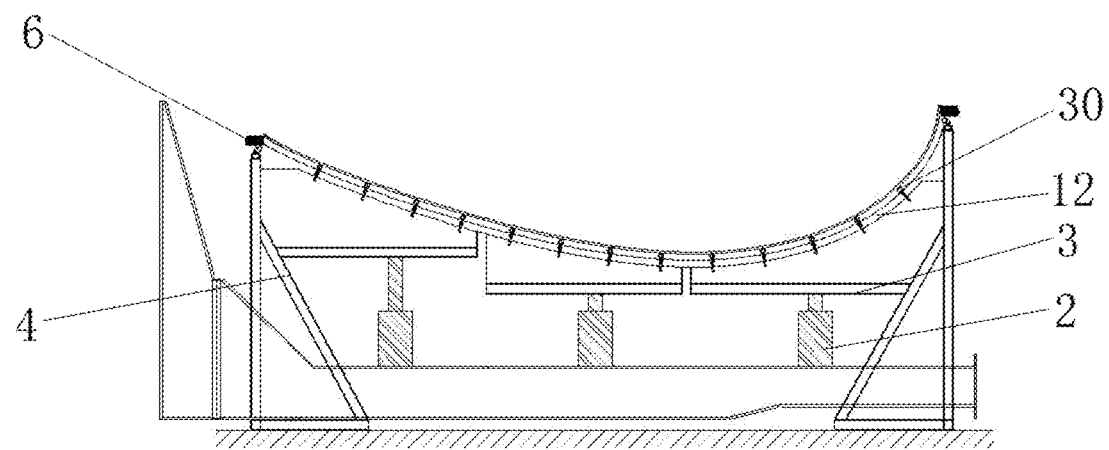
FIG. 1 is a schematic structural diagram of a mould shell mounted on a supporting mechanism.

The present invention will be further illustrated with reference to drawings below.

As shown in the drawings, the present invention provides a rigid wind turbine blade mould structure capable of rapidly replacing a mould profile, which comprises: a turning device 1, a cross sectional steel frame 20, bottom support adjusting devices 2, sectional support frames 3, supporting rods 4, guide rails 5, connecting device section steel structure 6, sliding blocks 7, bolt holes 8, an electromagnet 9, a metal block 10, a locking device 11, circular tubes 12, an electromagnet 9, a metal block 10, and a locking device 11.

Figure 2:
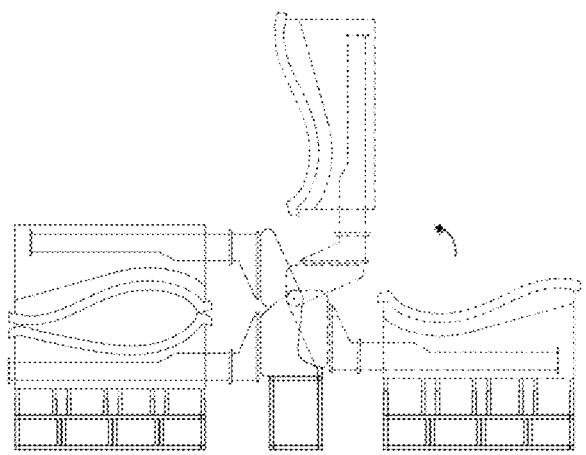
FIG. 2 is a schematic diagram of an operation state of a turning mechanism during turning over.
Figure 3:
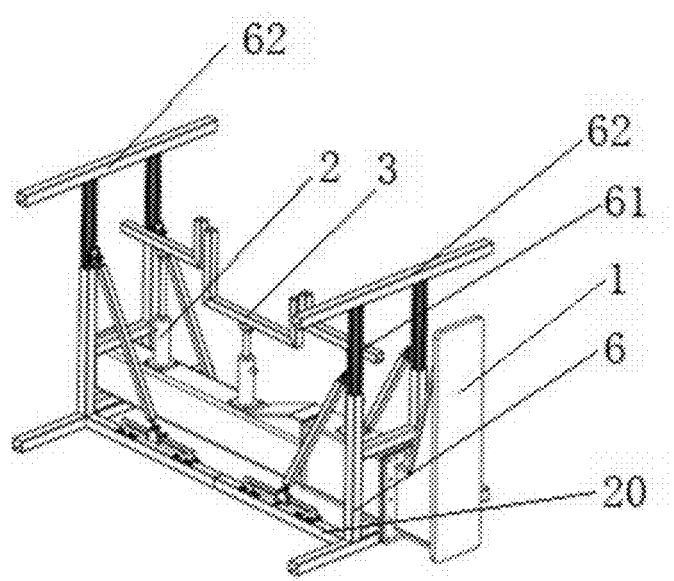
FIG. 3 is a schematic structural diagram of the present invention.
Figure 4:
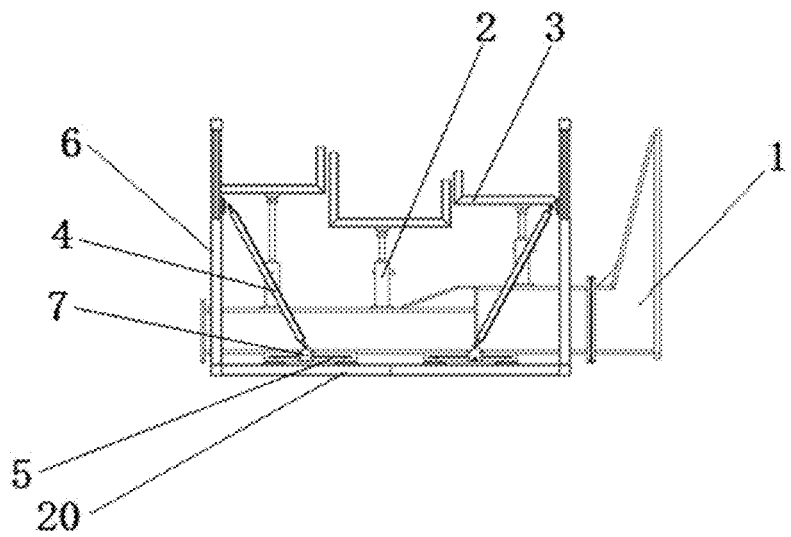
FIG. 4 is a front view of the present invention.
Figure 5:
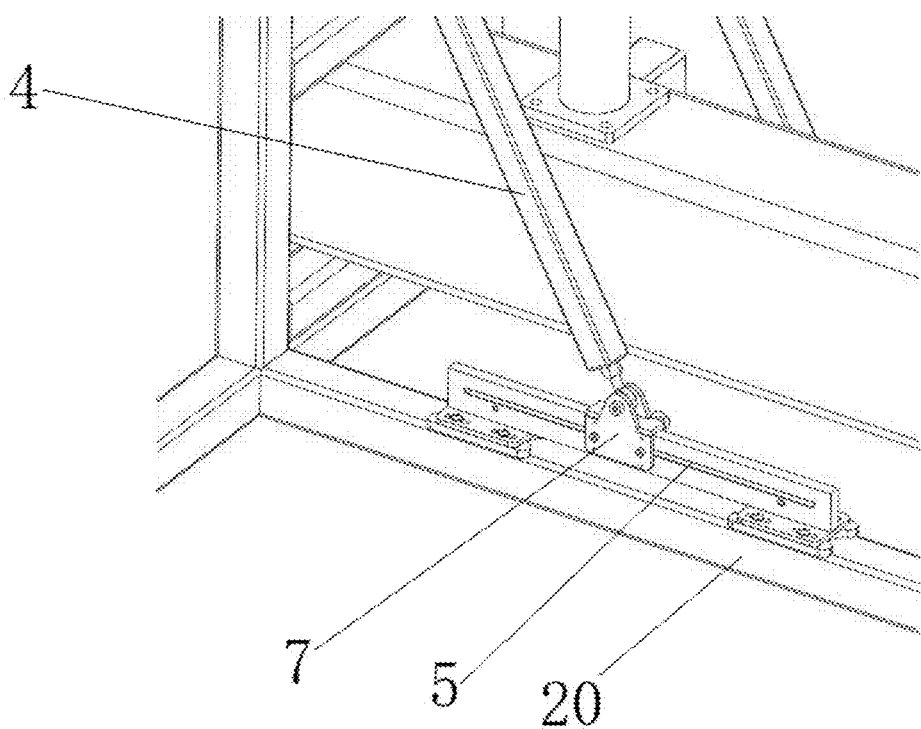
FIG. 5 is a detailed view of a guide rail.
Figure 6:
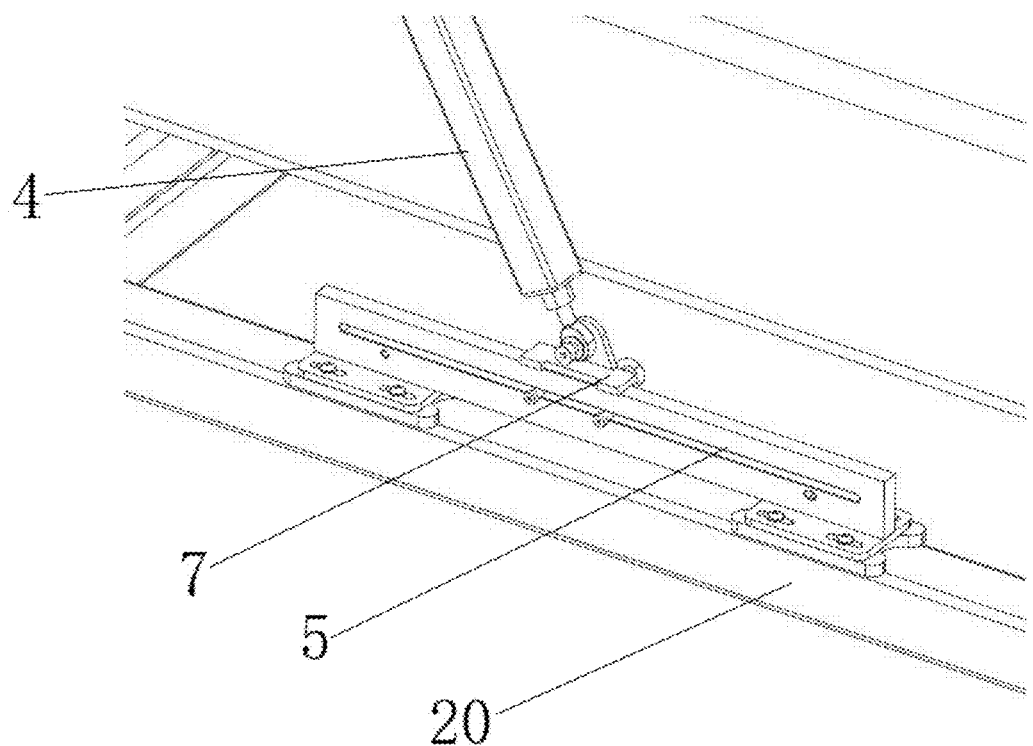
FIG. 6 is a schematic structural diagram of an inner structure of a sliding block.
Figure 7:
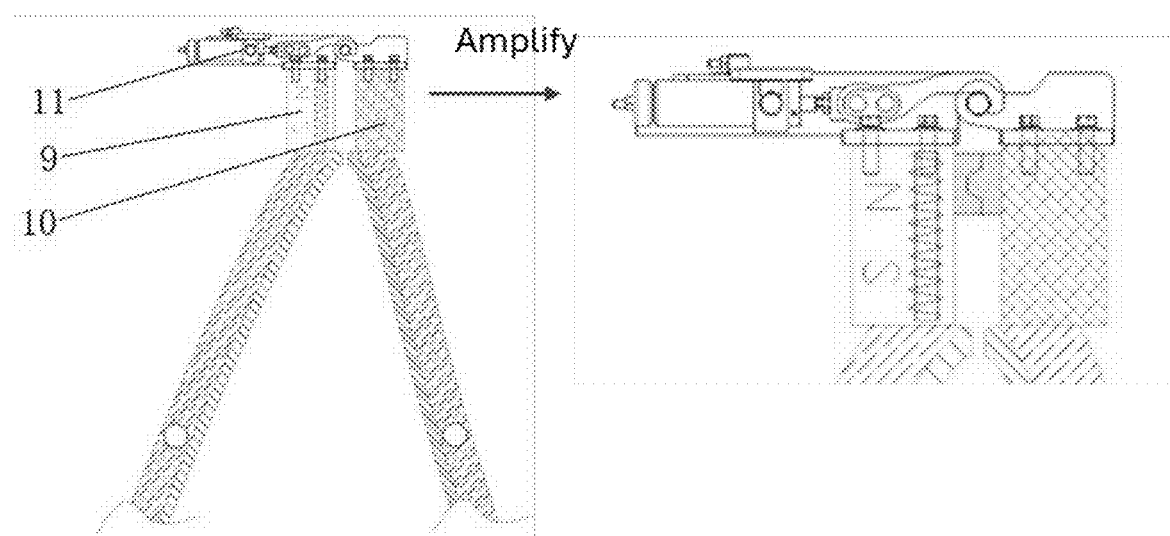
FIG. 7 is a schematic structural diagram of a locking device.
Figure 8:
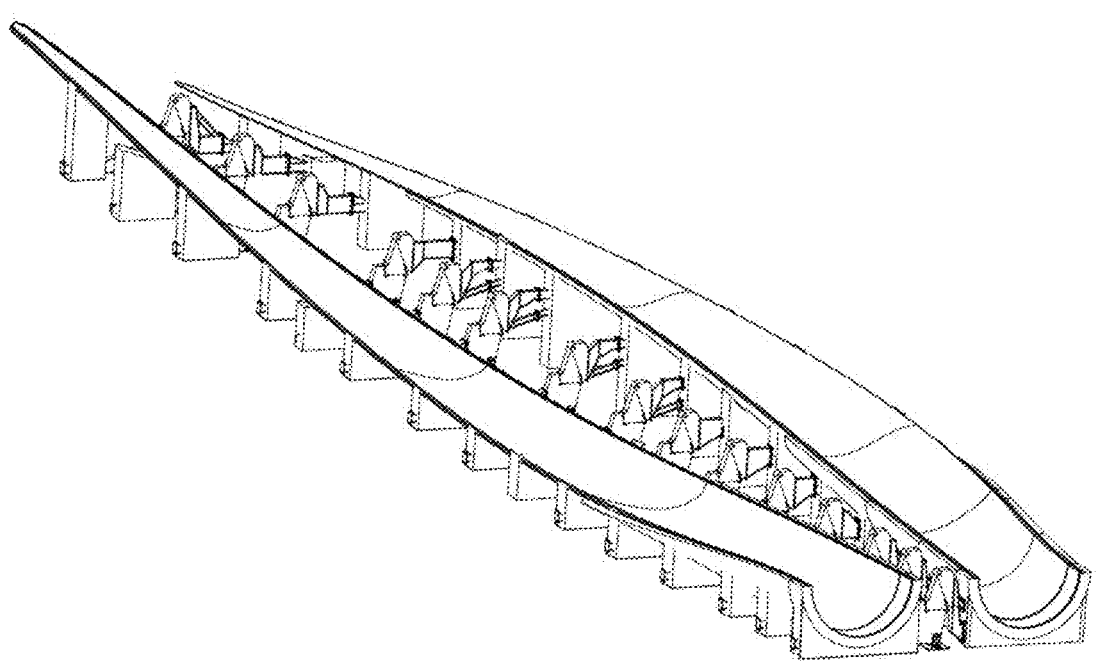
FIG. 8 is a schematic diagram of the present invention in an operation state.

The manufacture of the lower mould by the device requires the following steps: manufacturing a mould shell 30 on a master mould, analyzing the distribution interval of the bottom support adjusting devices 2, hand laying-up the back surface of the mould shell 30 and uniformly distributing circular tubes 11, coating a back rigid reinforcing layer material, and demoulding the master mould;

The manufacture of the upper mould by the device requires the following steps: manufacturing a mould shell 30 on a master mould, analyzing the distribution interval of the bottom support adjusting devices 2, hand laying-up the back surface of the mould shell 30 and uniformly distributing circular tubes 11, coating a back rigid reinforcing layer material, demoulding the master mould, turning over the cross sectional steel frame for mould assembly, connecting flange edges, and performing laser detection and mould profile adjustment according to a 3D model of the mould;

wherein the master mould is a master form, and the upper mould and the lower mould are both manufactured on the master mould, as shown in FIG. 1, if the lower mould is required to be manufactured, after the manufacturing of the lower mould is finished, the master mould positioned on the inner surface of the lower mould is demoulded, and if the upper mould is required to be manufactured, after the manufacturing of the upper mould is finished, the master mould on the inner surface of the upper mould is demoulded, and then the upper mould is turned over to be above the lower mould through the turning mechanism, as shown in FIG. 2.

When the shell structure needs to be replaced, only the mould shell 30 needs to be moved away from its corresponding sectional support frames 3, the bottom support adjusting devices 2 are reusable in the mould structure of different blade types, and after the mould shell is replaced, the height of the bottom support adjusting devices 2 can be used according to the change adjustment of the curvature of the surface of the mould shell 30, so that the waste and pollution are greatly reduced, the cost is saved, and a better solution for the sustainable development of economy and environment is provided.

Comparative Experimental Data

By taking an 80-meter mould available in the market as an example for comparison, various parameters of the mould shell are separately compared as follows:

| Taking a 80-meter mould as an example for comparison | | | |
|---|---|---|---|
| Nos. | Item | Normal shell mould | Rigid shell mould |
| 1 | Weight of mould shell (kg) | 8500 kg | 6000-10000 kg |
| 2 | Weight of mould frame (kg) | 18000 kg | Without mould frame |
| 3 | Thermal performance (temperature uniformity) | +/−5 C. | +/−3 C. |
| 4 | Mould shell profile replacement | Irreplaceable | Quickly replaceable |
| 5 | Time for mould shell mould profile replacement | The mould is re-manufactured for 30-40 days | The rigid mould shell is manufactured for 20-30 days |
| 6 | Flexural rigidity of mould shell | 500 Mpa-650 Mpa | 800-900 Mpa |
| 7 | Tensile strength of mould shell | 450 Mpa-550 Mpa | 560 Mpa-680 Mpa |
| 8 | Cost of the mould | 3 million-4 million | 2 million-3 million |
| 9 | Maximum stress of steel frame | 189.62 Mpa | Without steel frame |
| 10 | Mould deformation | 6 mm-14 mm | 4 mm-10 mm |

It can be seen from the comparison that the structure of the replaceable shell obtained by the method improves the flexural rigidity, thus greatly improving the anti-deformation capacity of a shell to simplify the supporting structure, accelerating the manufacturing and mounting process, reducing the dimensions of the structure, reducing the overall weight of a mechanism, facilitating the transportation, reducing the energy consumption and pollution, improving the mounting efficiency and saving the cost.

Embodiment 1

Step I, manufacturing a mould shell 30 on the outer surface of a master mould to serve as a lower mould, curing a mould profile layer, a heating layer and a reinforcing layer on the back surface of the mould shell 30 in sequence, then pre-embedding square tubes at flange edges on two sides of the mould shell 30, and curing for 7 hours at the temperature of 40° C.;

Step II, after the curing process of the pre-embedded square tubes of the mould is finished, analyzing the stress condition of each component on the mould shell 30 through FEA mechanics finite element analysis software;

Step III, after uniformly distributing circular tubes 11 on the back surface of the mould shell 30, reserving a connecting window for the circular tubes 11 and the supporting structure during hand laying-up 2 layers of epoxy resin and LTM800/225 fiberglass cloth, and curing for 12 hours at room temperature after the hand lay-up process is finished;

Step IV, after the hand lay-up process is finished, coating the back surface of the mould shell 30 with a back rigid reinforcing layer material;

the manufacture of the back rigid reinforcing layer comprises the following steps:
(1) adding 10 parts by mass of perlite, bentonite, ceramic particles, basalt or silicon oxide and 5 parts by mass of fiber wires, short steel wires or quartz sand into planetary stirring equipment, mixing for 5 min and then uniformly stirring, adding 30 parts by mass of epoxy resin into a stirrer, and stirring for 10 min to obtain a back rigid reinforcing layer material when the viscosity is 10000 cp;
(2) uniformly coating the back surface of the mould shell with the rigid reinforcing layer material except the reserved connecting window at a thickness of 2 cm by using extrusion equipment or a manual extrusion manner; and
(3) after the coating of the back surface of the mould shell except the reserved connecting window is finished, curing for 6-10 hours at room temperature to obtain the back rigid reinforcing layer.

Step V, demoulding the master mould after the back rigid reinforcing layer is formed;

wherein the adjustment of the bottom support adjusting devices 2 is performed for matching the supporting with different mould profiles according to the curvature fluctuation of the mould profiles, wherein the curvature fluctuation of the mould profiles is modeled in Pro/E software, and the curvature change of the mould profiles is obtained by combining ANASYS analysis software, so that the design adjustment of the mould profile support is performed;

the bottom support adjusting devices 2 are telescopic piston rods powered by an air pump as supporting elements, when the mould shell needs to be supported, the positions of the bottom support adjusting devices are determined according to the calculated result in the step II, then the curvature fluctuation of a mould profile is determined according to the curved surface condition of the outer surface of an upper mould and is modeled in Pro/E software, the curvature change of the mould profile is obtained by combining ANASYS analysis software, finally the extension length of the piston rods is determined according to the curvature change, after the sliding blocks 7 slide to limited positions on the guide rails 5, the sliding blocks 7 slide to limited positions on the guide rails 5 by inserting bolts into the bolt holes 8 in advance, so that the limited positions of the sliding blocks 7 sliding on the guide rails 5 are limited, the extension height of the telescopic rods 61 on two pieces of the connecting device section steel structure 6 is adjusted, and then the mould profile of the mould shell 30 is matched through the two pieces of connecting device section steel structure 6 and a plurality of sectional support frames 3, thereby achieving the supporting of the mould shell 30;

finally, the master mould is moved away from the supporting structure through a travelling crane.

Embodiment 2

Step I, manufacturing a mould shell 30 on the outer surface of a master mould to serve as a lower mould, curing a mould profile layer, a heating layer and a reinforcing layer on the back surface of the mould shell 30 in sequence, then pre-embedding square tubes at flange edges on two sides of the mould shell 30, and curing for 9 hours at the temperature of 50° C.;

Step II, after the curing process of the pre-embedded square tubes of the mould is finished, analyzing the stress condition of each component on the mould shell 30 through FEA mechanics finite element analysis software;

Step III, after uniformly distributing circular tubes 11 on the back surface of the mould shell 30, reserving a connecting window for the circular tubes 11 and the supporting structure during hand laying-up 2 layers of epoxy resin and LTM800/225 fiberglass cloth, and curing for 12 hours at room temperature after the hand lay-up process is finished;

Step IV, after the hand lay-up process is finished, coating the back surface of the mould shell 30 with a back rigid reinforcing layer material;

the manufacture of the back rigid reinforcing layer comprises the following steps:
(1) adding 30 parts by mass of perlite, bentonite, ceramic particles, basalt or silicon oxide and 10 parts by mass of fiber wires, short steel wires or quartz sand into planetary stirring equipment, mixing for 10 min and then uniformly stirring, adding 70 parts by mass of epoxy resin into a stirrer, and stirring for 20 min to obtain a back rigid reinforcing layer material when the viscosity is 20000 cp;
(2) uniformly coating the back surface of the mould shell with the rigid reinforcing layer material except the reserved connecting window at a thickness of 20 cm by using extrusion equipment or a manual extrusion manner; and
(3) after the coating of the back surface of the mould shell except the reserved connecting window is finished, curing for 10 hours at room temperature to obtain the back rigid reinforcing layer.

Step V, demoulding the master mould after the back rigid reinforcing layer is formed;

wherein the adjustment of the bottom support adjusting devices 2 is performed for matching the supporting with different mould profiles according to the curvature fluctuation of the mould profiles, wherein the curvature fluctuation of the mould profiles is modeled in Pro/E software, and the curvature change of the mould profiles is obtained by combining ANASYS analysis software, so that the design adjustment of the mould profile support is performed;

the bottom support adjusting devices 2 are telescopic piston rods powered by an air pump as supporting elements, when the mould shell needs to be supported, the positions of the bottom support adjusting devices are determined according to the calculated result in the step II, then the curvature fluctuation of a mould profile is determined according to the curved surface condition of the outer surface of an upper mould and is modeled in Pro/E software, the curvature change of the mould profile is obtained by combining ANASYS analysis software, finally the extension length of the piston rods is determined according to the curvature change, after the sliding blocks 7 slide to limited positions on the guide rails 5, the sliding blocks 7 slide to limited positions on the guide rails 5 by inserting bolts into the bolt holes 8 in advance, so that the limited positions of the sliding blocks 7 sliding on the guide rails 5 are limited, the extension height of the telescopic rods 61 on two pieces of the connecting device section steel structure 6 is adjusted, and then the mould profile of the mould shell 30 is matched through the two pieces of connecting device section steel structure 6 and a plurality of sectional support frames 3, thereby achieving the supporting of the mould shell 30;

finally, the master mould is moved away from the supporting structure through a travelling crane.

Embodiment 3

Step I, manufacturing a mould shell 30 on the outer surface of a master mould to serve as an upper mould, curing a mould profile layer, a heating layer and a reinforcing layer on the back surface of the mould shell 30 in sequence, then pre-embedding square tubes at flange edges on two sides of the mould shell 30, and curing for 8 hours at the temperature of 45° C.;

Step II, after the curing process of the pre-embedded square tubes of the mould is finished, analyzing the stress condition of each component on the mould shell 30 through FEA mechanics finite element analysis software;

Step III, after uniformly distributing circular tubes 11 on the back surface of the mould shell 30, reserving a connecting window for the circular tubes 11 and the supporting structure during hand laying-up 2 layers of epoxy resin and LTM800/225 fiberglass cloth, and curing for 12 hours at room temperature after the hand lay-up process is finished;

Step IV, after the hand lay-up process is finished, coating the back surface of the mould shell 30 with a back rigid reinforcing layer material;

the manufacture of the back rigid reinforcing layer comprises the following steps:
(1) adding 20 parts by mass of perlite, bentonite, ceramic particles, basalt or silicon oxide and 8 parts by mass of fiber wires, short steel wires or quartz sand into planetary stirring equipment, mixing for 7 min and then uniformly stirring, adding 50 parts by mass of epoxy resin into a stirrer, and stirring for 16 min to obtain a back rigid reinforcing layer material when the viscosity is 15000 cp;
(2) uniformly coating the back surface of the mould shell with the rigid reinforcing layer material except the reserved connecting window at a thickness of 10 cm by using extrusion equipment or a manual extrusion manner; and
(3) after the coating of the back surface of the mould shell except the reserved connecting window is finished, curing for 8 hours at room temperature to obtain the back rigid reinforcing layer.

Step V, demoulding the master mould after the back rigid reinforcing layer is formed.

wherein the adjustment of the bottom support adjusting devices 2 is performed for matching the supporting with different mould profiles according to the curvature fluctuation of the mould profiles, wherein the curvature fluctuation of the mould profiles is modeled in Pro/E software, and the curvature change of the mould profiles is obtained by combining ANASYS analysis software, so that the design adjustment of the mould profile support is performed;

the bottom support adjusting devices 2 are telescopic piston rods powered by an air pump as supporting elements, when the mould shell needs to be supported, the positions of the bottom support adjusting devices are determined according to the calculated result in the step II, then the curvature fluctuation of a mould profile is determined according to the curved surface condition of the outer surface of an upper mould and is modeled in Pro/E software, the curvature change of the mould profile is obtained by combining ANASYS analysis software, finally the extension length of the piston rods is determined according to the curvature change, after the sliding blocks 7 slide to limited positions on the guide rails 5, the sliding blocks 7 slide to limited positions on the guide rails 5 by inserting bolts into the bolt holes 8 in advance, so that the limited positions of the sliding blocks 7 sliding on the guide rails 5 are limited, the extension height of the telescopic rods 61 on two pieces of the connecting device section steel structure 6 is adjusted, and then the mould profile of the mould shell 30 is matched through the two pieces of connecting device section steel structure 6 and a plurality of sectional support frames 3, thereby achieving the supporting of the mould shell 30;

Step VI, after the demoulding of the master mould is finished, adding a rigid reinforcing layer;

wherein the connecting device section steel structure 6 and the circular tubes on the back surface of the mould shell are welded and fixed, a hand lay-up layer is added at the periphery of the circular tubes for connection, an inorganic non-metallic ceramic filler group is added into an epoxy resin or gelling agent serving as a basic carrier to serve as a reinforced ceramic shell, and the surface of the back rigid reinforcing layer is coated with the reinforced ceramic shell in a hand lay-up manner;

Step VII, performing mould assembly.

wherein the turning device 1 of the turning mechanism is welded on the cross sectional steel frame for turning over, the turning device is controlled by a hydraulic system to turn over the upper mould, and finally mould assembly is performed;

Step VIII, mounting a clamping mechanism to connect the mould shell;

wherein the flange edges of the upper mould and the lower mould are prefabricated with metal blocks 10 and electromagnets 9, the surfaces of the flange edges are provided with guide concave-convex devices for aligning the relative positions of the upper mould and the lower mould, the electromagnets 9 are powered on and powered off to lock and close the locking device 11 when the blade of the mould is cured, and the connection and disconnection of the joint of the flange edges of the upper mould and the lower mould are controlled by the locking device 11 in a hydraulic transmission or pneumatic transmission manner;

Step VIII, performing laser detection and mould profile adjustment according to a 3D model of the mould;

wherein the upper mould is turned over to be above the lower mould through the turning mechanism, after mould assembly is finished, the part needing to be adjusted is detected through the laser detection mechanism, and then mould profile adjustment of the upper mould and the lower mould after mould assembly is performed through polishing equipment or manpower.

The above embodiments are intended only to illustrate the technical concept and features of the present invention and to enable those skilled in the art to understand the contents of the present invention and to implement the present invention, but not to limit the protection scope of the present invention. All equivalent changes and modifications made according to the spirit of the present invention shall fall within the protection scope of the present invention.

What is claimed is:

1. A rigid wind turbine blade mould structure capable of rapidly replacing a mould shell profile, comprising: a stationary supporting structure for supporting an upper mould or a lower mould and a clamping structure for clamping the upper mould and the lower mould; wherein the stationary supporting structure comprises: a cross sectional steel frame (20), bottom support devices (2), a sectional support frame (3), supporting rods (4), guide rails (5), a plurality of connecting device section steel structures (6) and sliding blocks (7);

wherein the cross sectional steel frame (20) is arranged on a flip arm (1), the bottom support devices (2) are vertically mounted on a rectangular frame member the cross sectional steel frame (20) extending in the horizontal direction to connect to one of the connecting device section steel structures (6), the connecting device section steel structures (6) extend in the vertical direction, the cross sectional steel frame (20) and the connecting device section steel structures (6) are perpendicular to each other, one end of each of the connecting device section steel structures (6) is connected to a telescopic rod (61), the guide rails (5) are mounted at the cross sectional steel frame (20), one end of each supporting rods (4) is hinged to the corresponding telescopic rod (61), and the other end of each supporting rod (4) moves horizontally and linearly on the corresponding guide rail (5) through the corresponding sliding block (7);

the clamping mechanism comprises: an electromagnet (9), a metal block (10) and a bolt (11), wherein the electromagnet (9) or the metal block (10) are respectively mounted in a flange edge of the upper mould or the lower mould, and the bolt (11) is arranged at a joint of the flange edge of the upper mould and the flange edge of the lower mould.

2. The rigid wind turbine blade mould structure capable of rapidly replacing a mould profile according to claim 1, wherein the connecting device section steel structures (6) and the supporting rods (4) are respectively and symmetrically arranged on the cross sectional steel frame (20).

3. The rigid wind turbine blade mould structure capable of rapidly replacing a mould profile according to claim 1, wherein a piston rod on each bottom support accommodation device (2) is detachably connected with the corresponding sectional support frame (3).

4. The rigid wind turbine blade mould structure capable of rapidly replace a mould profile according to claim 1, wherein a shape of the sectional support frames (3) is matched with a shape of an outer surface of a mould shell (30) above the sectional support frames.

5. The rigid wind turbine blade mould structure capable of rapidly replacing a mould profile according to claim 1, wherein the number of the bottom support devices (2) is at least two.

6. The rigid wind turbine blade mould structure capable of rapidly replacing a mould profile according to claim 1, wherein the guide rails (5) are fixed at the lower frame member of the cross sectional steel frame (20) in a threaded connection manner.

7. The rigid wind turbine blade mould structure capable of rapidly replacing a mould profile according to claim 1, wherein the bottom support devices (2) are powered by an air pump system and a hydraulic system connected with a PLC circuit.

8. The rigid wind turbine blade mould structure capable of rapidly replacing a mould profile according to claim 1, wherein end parts of the two adjacent telescopic rods (61) are respectively and vertically connected with supporting connecting rods (62).

* * * * *